United States Patent [19]
Herbers

[11] Patent Number: 5,993,032
[45] Date of Patent: Nov. 30, 1999

[54] ARTICULATED PIECE

[75] Inventor: Thomas Herbers, Lippstadt, Germany

[73] Assignee: Hella Kg Hueck & Co., Lippstadt, Germany

[21] Appl. No.: 08/992,481

[22] Filed: Dec. 17, 1997

[30] Foreign Application Priority Data

Dec. 19, 1996 [DE] Germany ............................ 96 120 482

[51] Int. Cl.⁶ .................................................. B60Q 1/072
[52] U.S. Cl. ......................... 362/515; 362/528; 362/530
[58] Field of Search ................................... 362/270, 271, 362/275, 288, 514, 515, 523, 528, 529, 530, 531, 532

[56] References Cited

U.S. PATENT DOCUMENTS

| | | | |
|---|---|---|---|
| 4,894,754 | 1/1990 | Levilain | 362/421 |
| 4,967,318 | 10/1990 | Ewert et al. | 362/528 |
| 5,016,155 | 5/1991 | Chevance | 362/514 |
| 5,031,079 | 7/1991 | Kathmann | 362/514 |
| 5,580,149 | 12/1996 | Kusagaya | 362/528 |

FOREIGN PATENT DOCUMENTS 93 12 695 U  12/1993  Germany.

*Primary Examiner*—Alan Cariaso
*Attorney, Agent, or Firm*—Griffin, Butler, Whisenhunt & Szipl, LLP

[57] ABSTRACT

An articulated piece (4) for pivoting a pivotal reflector (2) of a vehicle headlight (1) about a first axis (7) and about a second axis (8) running perpendicular to the first axis, has, at an end facing the reflector, a joint shell (13) that can be connected to a translational-movable spherical head of an adjusting device for causing pivoting movement about the first axis, a snap-on part (11) at an opposite end that can be connected to the reflector, with the articulated piece being structured to be flexible in a plane running crosswise to the second axis.

9 Claims, 4 Drawing Sheets

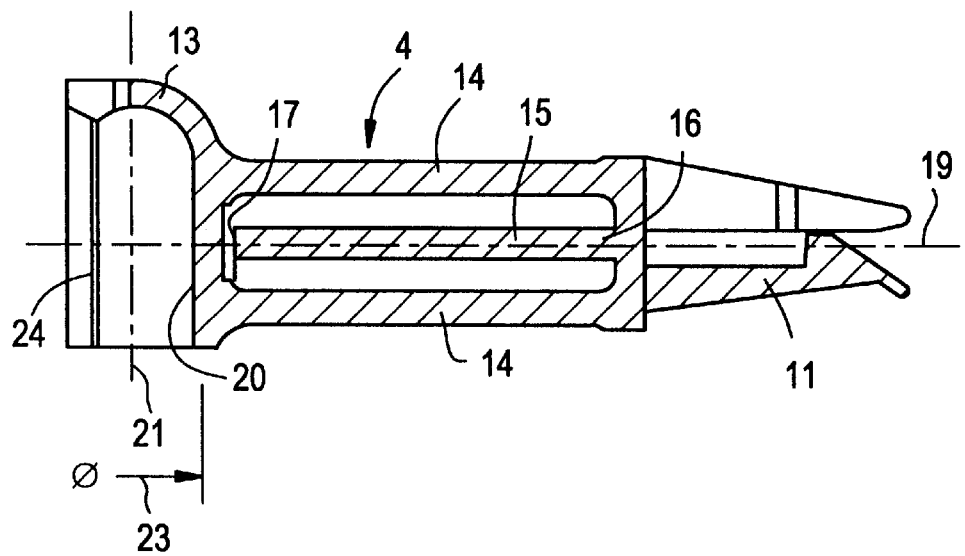
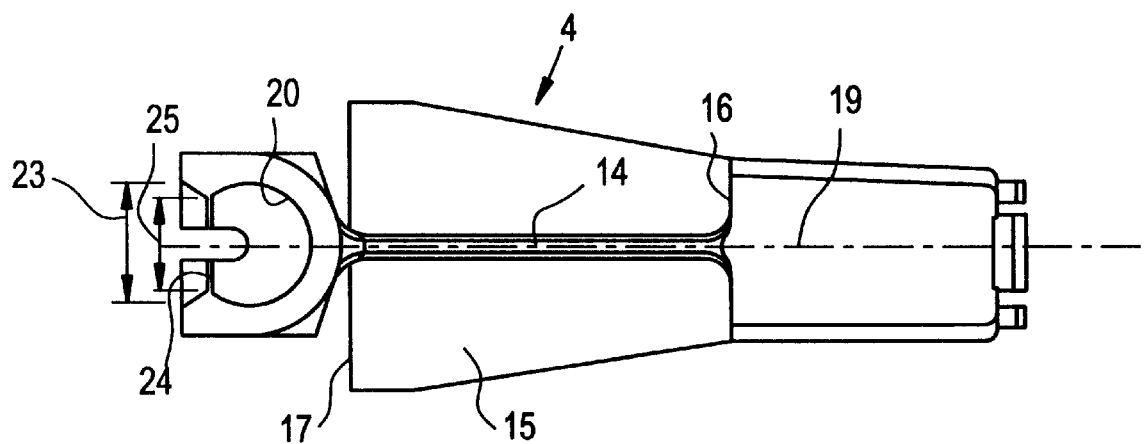

000
ARTICULATED PIECE

BACKGROUND OF THE INVENTION

This invention relates to an articulated piece for pivoting a pivotal reflector of a vehicle headlight about a first axis and about a second axis running perpendicular to the first axis, having, at an end facing away from the reflector, a joint shell that can be connected to a translational-movable spherical head of an adjusting device for pivoting about the first axis, and that can be connected to the reflector at an end opposite the joint shell.

German patent document DE-G 93 12 695.6 discloses a vehicle headlight wherein a reflector can be pivoted about a horizontal axis via an articulated piece. The reflector can also be pivoted about a vertical axis via a second articulated piece. Pivoting the reflector about the horizontal axis serves to regulate a light beam distance of the headlight. To that end, the reflector has a fixed joint at a vertical top, about which the reflector can be pivoted. At a vertical lower position, an end of the articulated piece directed toward the reflector is attached to a back of the reflector, so that its longitudinal axis runs approximately parallel to a longitudinal axis of the vehicle. At an end opposite the reflector, the articulated piece has a joint shell for connecting it to a joint bearing of an adjusting device. The joint bearing is movable in a translational manner by the adjusting device.

When the reflector is installed, the joint shell of the articulated piece is snapped onto a spherical head forming the joint bearing of the adjusting device. When this is done, the articulated piece must withstand relatively high latching, or snapping forces along its longitudinal axis, without buckling sidewardly. The spherical head is moved linearly by the adjusting device, while the joint shell tries to move in a circular path when the reflector is pivoted.

To minimize distortions of the reflector and radial forces of the joint shell acting on the spherical head, the articulated piece is structured to be flexible or elastic in a plane running perpendicular to the horizontal pivot axis. In this way, radial forces acting on the spherical head are decreased perpendicular to the horizontal axis. During pivoting about the second vertical pivoting axis, however, undesirable radial forces acting on the spherical head are created in a plane running perpendicular to the vertical pivoting axis.

It is an object of this invention to improve the prior-art articulated piece in such a way that radial forces occurring at the spherical head are further diminished or eliminated in both planes.

SUMMARY

According to principles of this invention, an articulated piece is structured to be flexible in a plane extending perpendicular to a second vertical pivoting axis.

BRIEF DESCRIPTION OF THE DRAWINGS

The invention is described and explained in more detail below using an embodiment shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout different views. The drawings are not necessarily to scale, emphasis instead being placed upon illustrating principles of the invention in a clear manner.

FIG. 5 is a side cross-sectional view of the articulated piece of FIG. 4, and FIG. 6 is a bottom view of the articulated piece of FIG. 5.

DESCRIPTION OF THE PREFERRED EMBODIMENT

Figure 1:
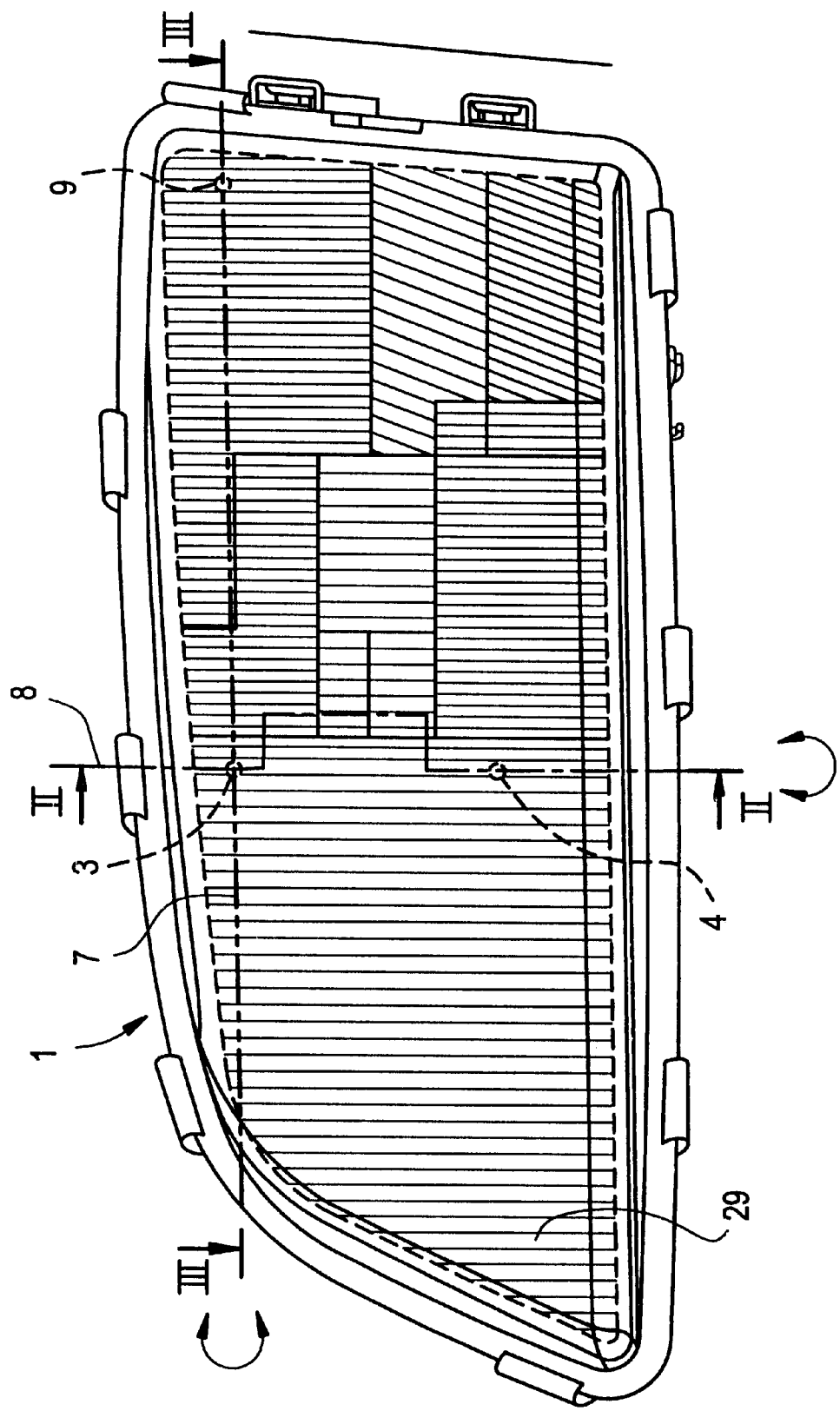
FIG. 1 is a reduced front view of a vehicle headlight on which this invention is used.
Figure 2:
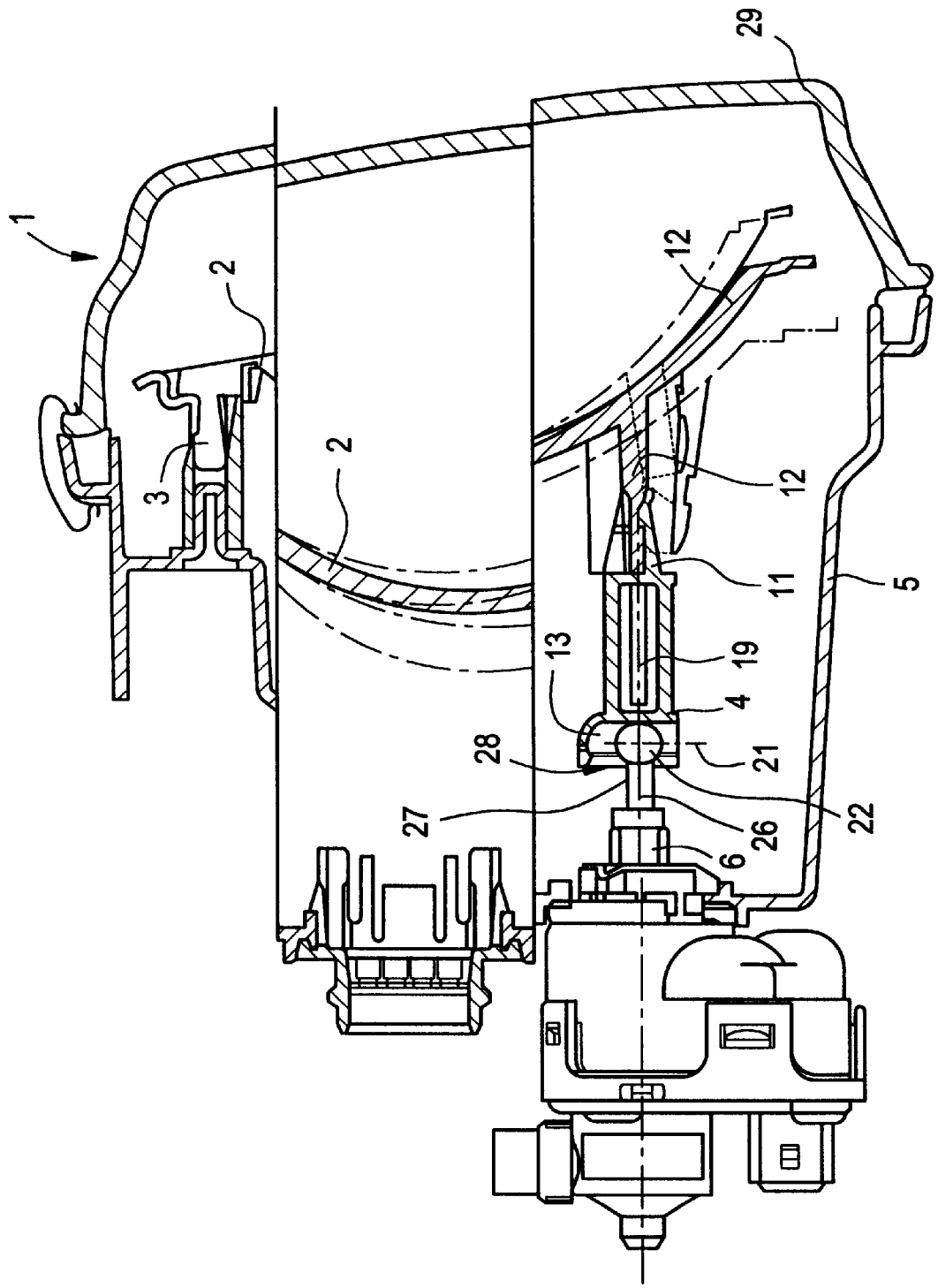
FIG. 2 is a cross-sectional view taken on line II—II in FIG. 1.
Figure 3:
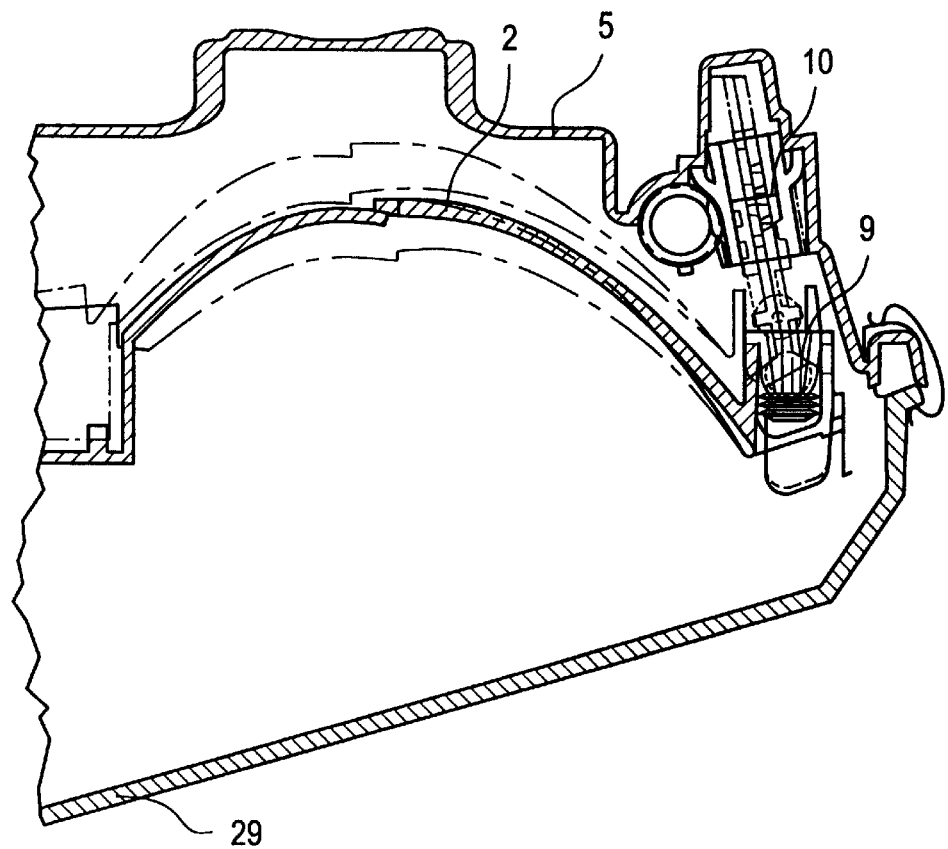
FIG. 3 is a segmented cross-sectional view taken on line III—III in FIG. 1.
Figure 4:
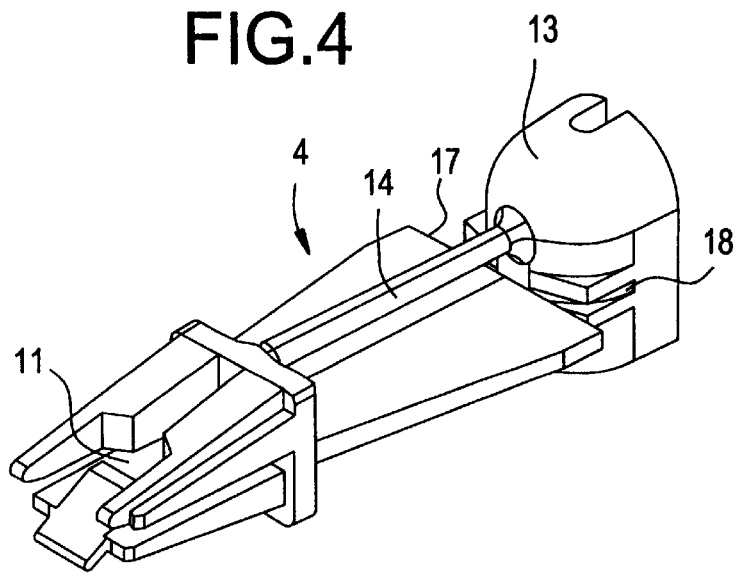
FIG. 4 is an isometrical enlarged view of an articulated piece of this invention.

A vehicle headlight 1 comprises primarily a reflector 2, a fixed joint 3, an articulated piece 4, and an adjusting device 6 mounted on a receiving part 5. The reflector 2 can pivot about a horizontal first axis 7 that runs through the fixed joint 3. In addition, the reflector 2 can also pivot about a vertical second axis 8 that also runs through the fixed joint 3. At a distance from the vertical axis 8, a second articulated piece 9 connecting the reflector 2 to a driving device 10 for pivoting about the vertical axis 8 is placed on the horizontal axis 7. The second articulated piece 9 can correspond to the (first) articulated piece 4. However, the second articulated piece 9 is then preferably rotated by an angle of 90 degrees with respect to the articulated piece 4, about its longitudinal axis. The receiving part 5 is covered by a headlight lens 29.

The articulated piece 4 has a snap-on part 11 at an end directed toward the reflector 2. The snap-on part 11 can be connected to a corresponding counterpart 12 of the reflector 2. At the end opposite the snap-on part 11, the articulated piece 4 has a joint shell 13. The snap-on part 11 and joint shell 13 are connected via two vertically separated connecting bars 14 running in parallel, one above the other. A cross section of the connecting bars 14 is oval. However, the connecting bars 14 may also be designed with a round or rectangular cross section. A stop rib 15 is attached to the snap-on part 11 between the connecting bars 14.

The stop rib 15 is designed as a flat, roughly trapezoidal tongue, a narrow base 16 of which is arranged or formed on the snap-on part 11. A wide base 17, opposite the narrow base 16, stands at a spaced distance from the joint shell 13. When the connecting bars 14 bend about a vertical axis, one of stop faces 18 of the joint shell 13 facing the stop rib comes into contact with the wide base 17 of the stop rib 15. The articulated piece 4 has a longitudinal axis 19 running through the stop rib 15. An internal shape 20 of the joint shell 13 is cylindrical, and its shell axis 21 runs vertically. Extending crosswise with respect to the shell axis 21, a diameter 23 of this cylindrical internal shape 20 is adapted to a spherical head 22 of the adjusting device 6. Toward the adjusting device 6, the joint shell 13 has a vertical longitudinal slot 24, a width 25 of which is designed so that the spherical head 22 can snap therethrough into the joint shell 13 or the cylindrical internal shape 20. The spherical head 22 is arranged at a free end of a sliding (along its length-axis 26) translational moving shaft 27 of the adjusting device 6. The spherical head 22 is located in the joint shell 13 so that it can be displaced lengthwise, in the direction of the shell axis 21, relative to the joint shell 13. The longitudinal axis 26 is located in approximate alignment with the longitudinal axis 19 of the articulated piece 4. However, the longitudinal axis 26 of the adjusting shaft 27 may also be placed at an angle with respect to the longitudinal axis 19 of the articulated piece 4.

To mount the reflector 2, the snap-on part 11 of the articulated piece 4 is pushed over the counterpart 12 so that the snap-on part 11 snaps onto the counterpart 12. The reflector 2 is placed on the receiving part so that the joint shell 13 is seated on the spherical head 22 of the adjusting device 6. By applying snapping or latching force in the direction of the longitudinal axis 19, the reflector is mounted in the receiving part 5, with the spherical head 22 of the adjusting device 6 snapped into the joint shell 13 of the articulated piece 4, with the second articulated piece 9 connected to the driving device 10 and the reflector 2 connected with the fixed joint 3.

Because the articulated piece is structured to be flexible crosswise to the second pivoting axis 8, no radial forces are transmitted to the spherical head 22 or the adjusting device 6 during pivoting about the second axis.

According to a preferred embodiment of the invention, the joint shell is structured to be movable relative to the spherical head along a shell axis running parallel to the second axis, perpendicular to a longitudinal axis. Because the joint shell is structured to be movable, relative to the spherical head, perpendicular to the longitudinal axis of the articulated piece during pivoting about the first axis, for example about the horizontal axis, no radial forces are transmitted to the adjusting device when the shell is pivoted about the first axis. At the same time, the articulated piece can withstand relatively high latching, or snapping, forces during mounting.

According to a preferred embodiment of the invention, a connection between the joint shell and the end opposite the joint shell is made to be elastically deformable perpendicular to the longitudinal axis and perpendicular to the shell axis by two connecting bars running parallel to each other. By means of these connecting bars, the joint comprising the spherical head and joint shell can be positioned at a relatively large distance from the reflector. In this way, radial forces can be kept relatively small during pivoting about the vertical axis.

According to another preferred embodiment of the invention, the stop rib is arranged between the connecting bars at the end opposite the joint shell. The elastic distortion and the vertical axis are limited by the stop rib. At the same time, the stop rib prevents or restricts outward buckling of the connecting bars when a strong latching force is applied.

While the invention has been particularly shown and described with reference to a preferred embodiment, it will be understood by those skilled in the art that various changes in form and detail may be made therein without departing from the spirit and scope of the invention.

The invention claimed is:

1. An articulated piece for use in articulating apparatus for pivoting a pivotal reflector of a vehicle headlight about a first axis and about a second axis running perpendicular to the first axis, said articulated piece having, at an end to be directed away from the reflector, a joint shell for connecting to a translationally-movable spherical head of an adjusting device for pivoting the reflector about the first axis, and, at an end opposite the joint shell, a means for connecting to the reflector, wherein the articulated piece is to be spaced from the first axis and is flexible in a plane substantially perpendicular to the second axis;

wherein the joint shell is structured to be moved, relative to the spherical head, perpendicular to a longitudinal axis of the articulated piece, along a shell axis running parallel to the second axis.

2. An articulated piece as in claim 1, wherein the joint shell, whose shell axis is transverse to the longitudinal axis of the articulated piece, is cylindrical and has a longitudinal slot, the width of the slot being such that the spherical head can engage in the joint shell via a member passing through the longitudinal slot.

3. An articulated piece as in claim 1, wherein, between the joint shell and the end opposite the joint shell, a connection is provided which is elastically deformable substantially perpendicular to the longitudinal axis of the articulated piece and substantially perpendicular to the shell axis.

4. An articulated piece as in claim 3, wherein the elastically-deformable connection has two spaced, parallel connecting bars.

5. An articulated piece as in claim 4, wherein a stop rib is provided at the end opposite the joint shell between the connecting bars.

6. An articulated piece as in claim 1, wherein the first axis is a substantially horizontal axis, with the longitudinal axis of the articulated piece also being a substantially horizontal axis and being substantially perpendicular to and spaced from the first axis, and wherein the articulated piece has a shell axis that runs approximately vertically.

7. An articulated piece as in claim 1, wherein the spherical head can be moved in a translational manner approximately in a direction of the longitudinal axis of the articulated piece.

8. An articulated piece as in claim 6, wherein the second axis is positioned approximately at the longitudinal axis of the articulated piece.

9. An articulated piece as in claim 1, wherein the end opposite the joint shell has a snap-on part that can be connected, by snapping into place, with a corresponding counterpart of the reflector.

* * * * *